US011691554B2

(12) United States Patent
Sakurai et al.

(10) Patent No.: US 11,691,554 B2
(45) Date of Patent: Jul. 4, 2023

(54) ENTRANCE HANDRAIL

(71) Applicant: TOYOTA JIDOSHA KABUSHIKI KAISHA, Aichi-ken (JP)

(72) Inventors: Hideyuki Sakurai, Toyota (JP); Yuto Ota, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 1 day.

(21) Appl. No.: 17/669,359

(22) Filed: Feb. 11, 2022

(65) Prior Publication Data
US 2022/0289091 A1 Sep. 15, 2022

(30) Foreign Application Priority Data

Mar. 9, 2021 (JP) ................................. 2021-037738

(51) Int. Cl.
B60J 5/06 (2006.01)
B60N 3/02 (2006.01)
B60J 5/04 (2006.01)

(52) U.S. Cl.
CPC .............. B60N 3/023 (2013.01); B60J 5/062 (2013.01); B60J 5/0479 (2013.01)

(58) Field of Classification Search
CPC .......... B60N 3/023; B60N 3/026; B60N 3/02; B60N 2002/0256; B60J 5/0479; B60J 5/062
USPC .................................................. 296/1.02, 155
See application file for complete search history.

(56) References Cited

U.S. PATENT DOCUMENTS

| 4,482,284 | A | * | 11/1984 | Robbins | ................. | A61G 3/062 |
| | | | | | | 414/539 |
| 5,910,077 | A | * | 6/1999 | Aumiller | ................ | B60N 2/797 |
| | | | | | | 49/460 |
| 10,925,446 | B2 | * | 2/2021 | Edwards | .............. | A47K 17/024 |
| 10,946,780 | B2 | * | 3/2021 | Bacon | ................... | E05B 1/0015 |

(Continued)

FOREIGN PATENT DOCUMENTS

| CA | 3168295 A1 * | 1/2023 | ............. B60N 3/023 |
| JP | H8118958 A | 5/1996 | |
| JP | 2021104778 A | 7/2021 | |

OTHER PUBLICATIONS

Unpublished U.S. Appl. No. 17/580,638, filed Jan. 21, 2022, 43pp.

Primary Examiner — Amy R Weisberg
Assistant Examiner — Sara Laghlam
(74) Attorney, Agent, or Firm — Hauptman Ham, LLP

(57) ABSTRACT

An entrance handrail includes: a base portion rotatably provided with an up-down direction as an axial direction; a rail portion extending from a lower portion of the base portion and holding a slide member to be slidable, the slide member being attached to a sliding door; a first handrail body extending from an upper portion of the base portion, disposed on a vehicle cabin side when the sliding door closes the entrance, and projecting outward of the vehicle such that a passenger can hold the first handrail body when the sliding door opens the entrance; and second handrail body disposed on the vehicle cabin side with respect of the rail portion when the sliding door closes the entrance and disposed inward of the rail portion in a width direction of the entrance such that the passenger can hold the second handrail body when the sliding door opens the entrance.

6 Claims, 11 Drawing Sheets

(56) References Cited

U.S. PATENT DOCUMENTS

| | | | |
|---|---|---|---|
| 11,046,226 B1* | 6/2021 | Younce | B60N 3/023 |
| 11,433,796 B2* | 9/2022 | Sakurai | B60N 3/023 |
| 2015/0123424 A1* | 5/2015 | Anderson | B60J 5/06 |
| | | | 296/155 |
| 2020/0114797 A1* | 4/2020 | Sakurai | B60N 3/023 |
| 2021/0009021 A1* | 1/2021 | Nakai | B62D 31/02 |
| 2021/0197701 A1* | 7/2021 | Sakurai | B60N 3/023 |
| 2022/0063471 A1* | 3/2022 | Sakurai | A61L 2/10 |
| 2022/0176860 A1* | 6/2022 | Zarraga | B62D 25/04 |
| 2022/0289091 A1* | 9/2022 | Sakurai | B60J 5/062 |

* cited by examiner

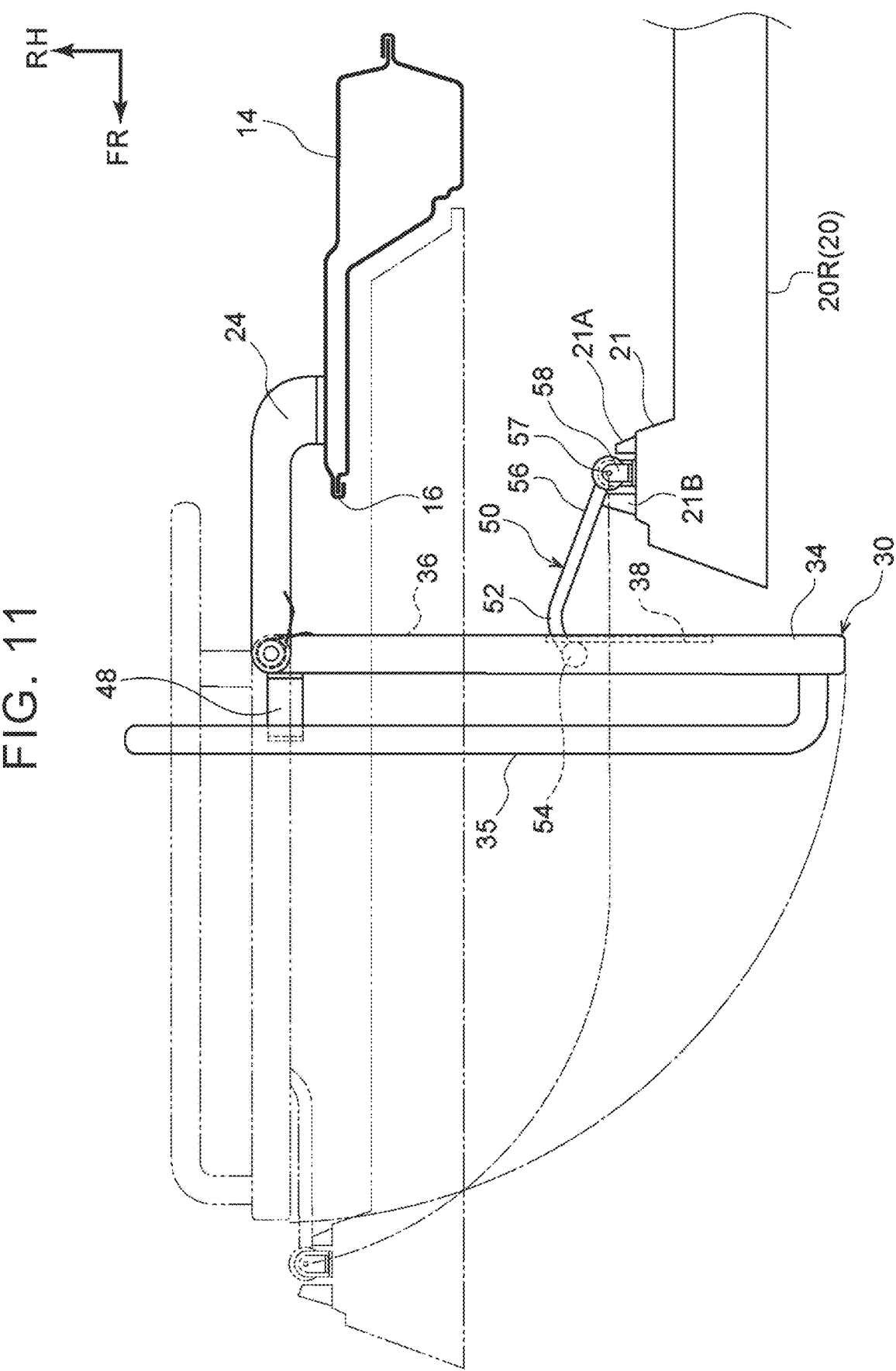

ENTRANCE HANDRAIL

CROSS-REFERENCE TO RELATED APPLICATION

This application claims priority to Japanese Patent Application No. 2021-037738 filed on Mar. 9, 2021, incorporated herein by reference in its entirety.

BACKGROUND

1. Technical Field

The present disclosure relates to an entrance handrail.

2. Description of Related Art

An entrance handrail that projects outward of a vehicle from an entrance of a bus in a state where a swing door is open and projects inward of the vehicle in a state where the swing door is closed to hinder entrance of a passenger through the entrance has been conventionally known (see, for example, Japanese Unexamined Patent Application Publication No. 8-118958 (JP 8-118958 A)).

SUMMARY

However, when only one handrail body that can be held as the entrance handrail is provided at a predetermined height position, some passengers may not match their heights with the height of the handrail body and fail to hold the handrail body. That is, in a vehicle such as a bus, there is still a room for improvement from the viewpoint of allowing the passenger to select and hold the handrail body according to his or her height.

Therefore, an object of the present disclosure is to obtain an entrance handrail that allows a passenger to select and hold a handrail body according to his or her height.

In order to achieve the above object, an entrance handrail according to claim 1 according to the present disclosure includes: a base portion that is rotatably provided around an entrance of a vehicle with an up-down direction of a vehicle body as an axial direction; a rail portion extending from a lower portion of the base portion and holding a slide member so as to be slidable, the slide member being attached to a sliding door that moves along an outer wall surface of the vehicle and that opens and closes the entrance; a first handrail body that extends from an upper portion of the base portion, is disposed on a vehicle cabin side as the slide member slides along the rail portion to a side opposite to the base portion side in a state where the sliding door closes the entrance, and projects outward of the vehicle as the slide member slides along the rail portion to the base portion side such that a passenger who enters or exits the vehicle through the entrance is able to hold the first handrail body in a state where the sliding door opens the entrance; and second handrail body of which one end portion side is supported by a tip end portion of the rail portion in an extending direction and the other end portion side is supported by the base portion, and that is disposed on the vehicle cabin side with respect of the rail portion in the state where the sliding door closes the entrance and disposed inward of the rail portion in a width direction of the entrance such that the passenger who enters or exits the vehicle through the entrance is able to hold the second handrail body in the state where the sliding door opens the entrance.

In the disclosure according to claim 1, the entrance handrail includes the first handrail body and the second handrail body. The first handrail body projects outward of the vehicle such that the passenger who enters or exits the vehicle through the entrance is able to hold the first handrail body in the state where the sliding door opens the entrance. The second handrail body is disposed inward of the rail portion in the width direction of the entrance such that the passenger who enters or exits the vehicle through the entrance is able to hold the second handrail body. That is, in addition to the first handrail body, the second handrail body is provided. Therefore, the passenger can select and hold the first handrail body or the second handrail body in accordance with his or her height.

The entrance handrail according to claim 2 is the entrance handrail according to claim 1, and the second handrail body is disposed below the first handrail body in the up-down direction of the vehicle body over an entire length.

In the disclosure according to claim 2, the second handrail body is disposed below the first handrail body in the up-down direction of the vehicle body over the entire length. Therefore, the passenger can easily select and hold the first handrail body or the second handrail body in accordance with his or her height.

The entrance handrail according to claim 3 is the entrance handrail according to claim 1, and a cover member is provided between the rail portion and the second handrail body such that hand and fingers of the passenger do not touch the rail portion.

In the disclosure according to claim 3, the cover member is provided between the rail portion and the second handrail body such that the hand and fingers of the passenger do not touch the rail portion. Therefore, it is possible to suppress the passenger from accidentally touching the rail portion and the hand and fingers of the passenger from being pinched between the slide member and the rail portion.

The entrance handrail according to claim 4 is the entrance handrail according to claim 3, and when viewed from a longitudinal direction of the rail portion, an upper end portion of the cover member is curved in an arc shape.

In the disclosure according to claim 4, the upper end portion of the cover member is curved in an arc shape. Therefore, even when the passenger accidentally touches the upper end portion of the cover member while holding the first handrail body, injury of the hand and fingers can be suppressed.

The entrance handrail according to claim 5 is the entrance handrail according to claim 3, and when viewed from a longitudinal direction of the rail portion, an upper end portion of the cover member is bent at a right angle and covers an upper side of the rail portion in the up-down direction of the vehicle body.

In the disclosure according to claim 5, the upper end portion of the cover member is bent at the right angle and covers an upper side of the rail portion in the up-down direction of the vehicle body. That is, the cover member is configured in the minimum necessary size. Therefore, an increase in the weight of the vehicle and an increase in the manufacturing cost related to the cover member are suppressed. Note that, the "right angle" in the present disclosure includes a "substantially right angle" that is close to an exact right angle, in addition to the exact right angle.

The entrance handrail according to claim 6 is the entrance handrail according to claim 1, and the tip end portion of the first handrail body in the extending direction and the tip end portion of the rail portion in the extending direction are integrally connected to each other.

In the disclosure according to claim 6, the tip end portion of the first handrail body in the extending direction and the tip end portion of the rail portion in the extending direction are integrally connected to each other. Therefore, at least the rigidity and strength of the first handrail body can be improved compared to the case where the tip end portion of the first handrail body in the extending direction and the tip end portion of the rail portion in the extending direction are not integrally connected to each other.

As described above, according to the present disclosure, the passenger can select and hold the handrail body in accordance with his or her height.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 11 is a plan view showing a second modification of the entrance handrail corresponding to FIG. 9 according to the present embodiment.

DETAILED DESCRIPTION OF EMBODIMENTS

Hereinafter, embodiments of the present disclosure will be described in detail with reference to the drawings. An entrance handrail 30 according to the present embodiment is suitably provided for a small-sized bus (including a Mobility as a Service (Maas) vehicle represented by an autonomous driving bus) 10 that is an example of a shared vehicle as a vehicle (see FIGS. 1 and 2).

Therefore, for convenience of explanation, the arrow UP shown in each drawing indicates the upward direction of the vehicle body of the bus 10, the arrow FR indicates the front direction of the vehicle body of the bus 10, the arrow LH indicates the left direction of the vehicle body of the bus 10, and the arrow RH indicates the right direction of the vehicle body of the bus 10. In the following description, when the directions of up and down, front and rear, and right and left are described unless otherwise specified, the terms indicate up and down in an up-down direction of the vehicle body, front and rear in a front-rear direction of the vehicle body, and right and left in a right-left direction (vehicle width direction) of the vehicle body.

Figure 1:
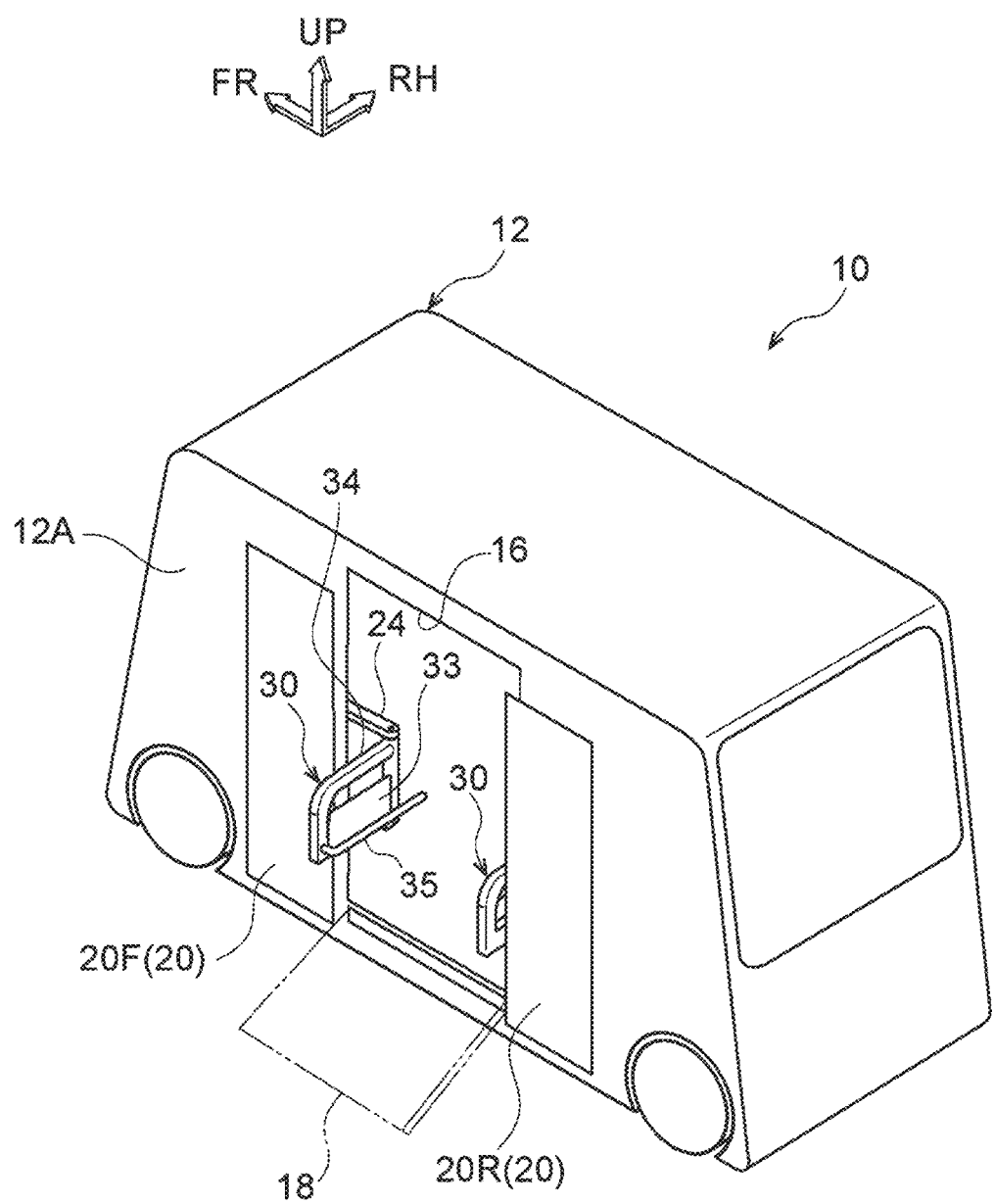
FIG. 1 is a perspective view showing a bus that is provided with entrance handrails according to the present embodiment and of which entrance is open.
Figure 2:
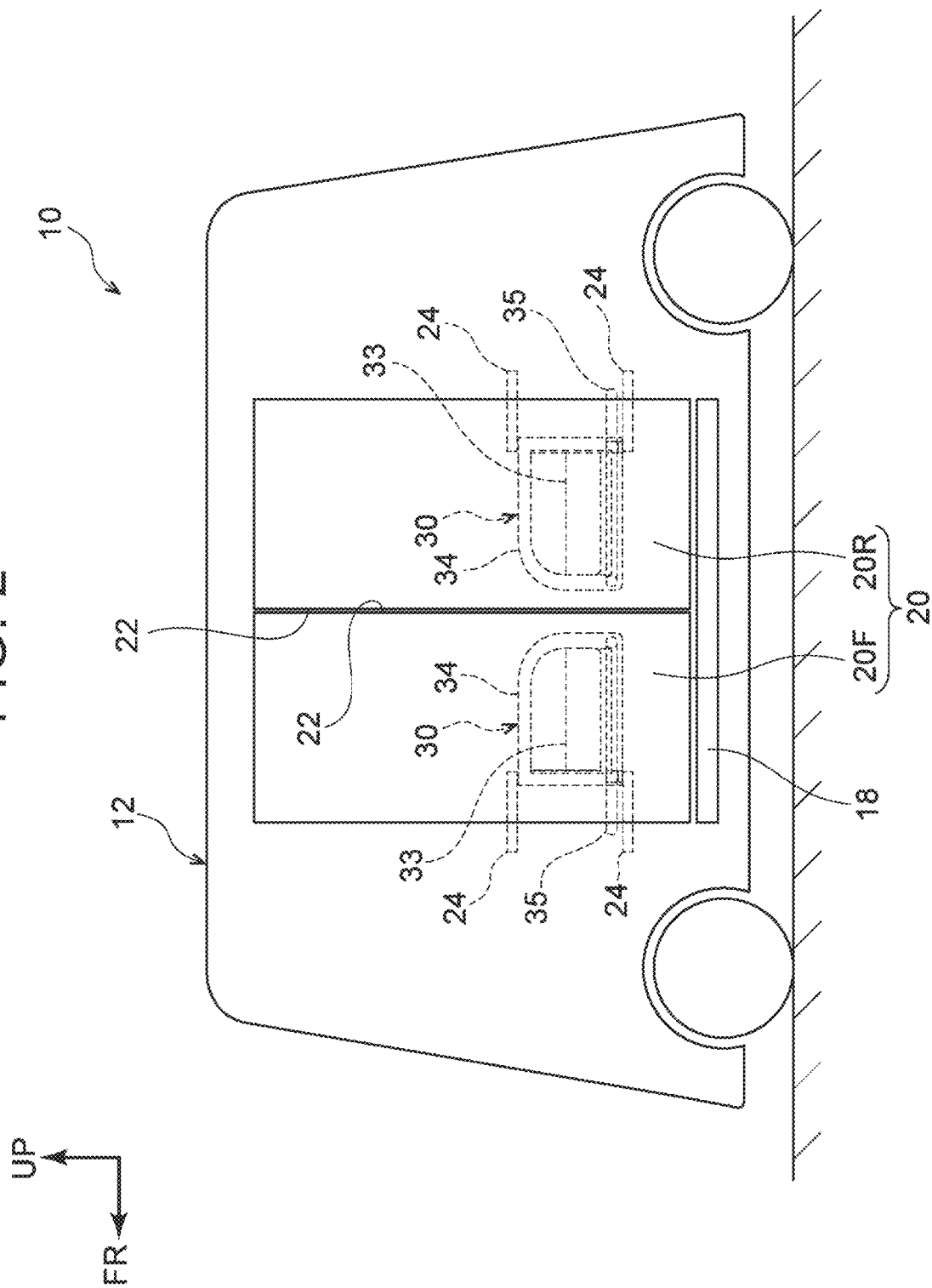
FIG. 2 is a perspective view showing the bus that is provided with the entrance handrails according to the present embodiment and of which entrance is closed.

As shown in FIGS. 1 and 2, an entrance 16 having a rectangular shape when viewed in side view is provided on the left side wall (one side wall) of a vehicle body 12 of the bus 10 at a substantially central portion in the front-rear direction. The bus 10 is provided with a sliding door 20 that opens and closes the entrance 16 as the doors of the sliding door 20 move in opposite directions to each other along a substantially front-rear direction.

The sliding door 20 includes a rectangular front half door 20F and a rectangular rear half door 20R of which lengths in the up-down direction are longer than lengths in the front-rear direction when viewed in side view. The sliding door 20 is configured to be able to open and close the entrance 16 as the front half door 20F and the rear half door 20R slide (move) synchronously along an outer wall surface 12A of the bus 10 in the direction to separate from each other and in the direction to be close to each other.

Figure 7:
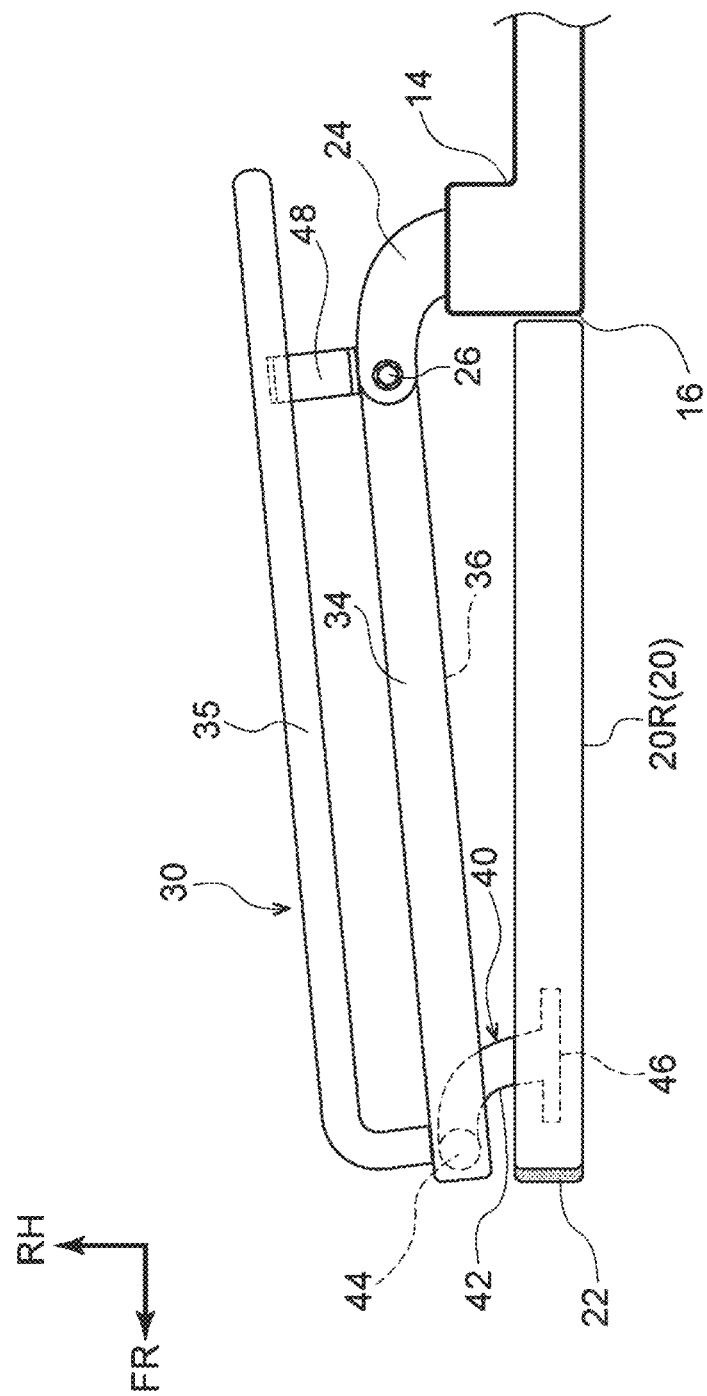
FIG. 7 is a plan view showing the retracted posture of the entrance handrail according to the present embodiment.
Figure 9:
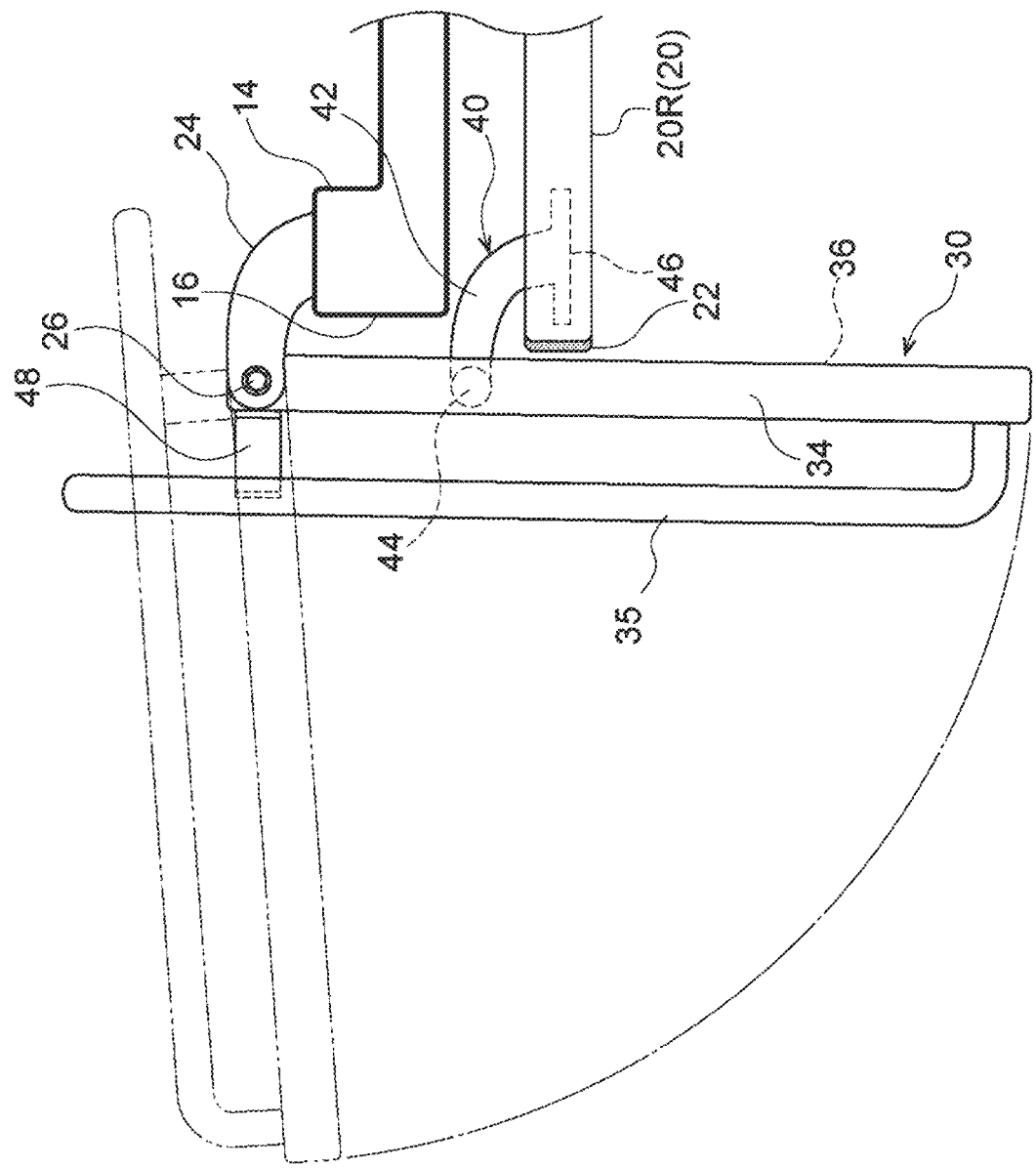
FIG. 9 is a plan view showing the extended posture of the entrance handrail according to the present embodiment.

Note that, elastic bodies 22 such as a rubber are respectively attached to inner end faces of the half door 20F and the half door 20R in the front-rear direction (in other words, a rear end face of the half door 20F and a front end face of the half door 20R) that come into contact with each other when the entrance 16 is closed over the entire length in the up-down direction (see FIGS. 2, 7, and 9). That is, the half door 20F and the half door 20R close the entrance 16 as the elastic bodies 22 are brought into contact with each other while the elastic bodies are elastically deformed.

Figure 8:
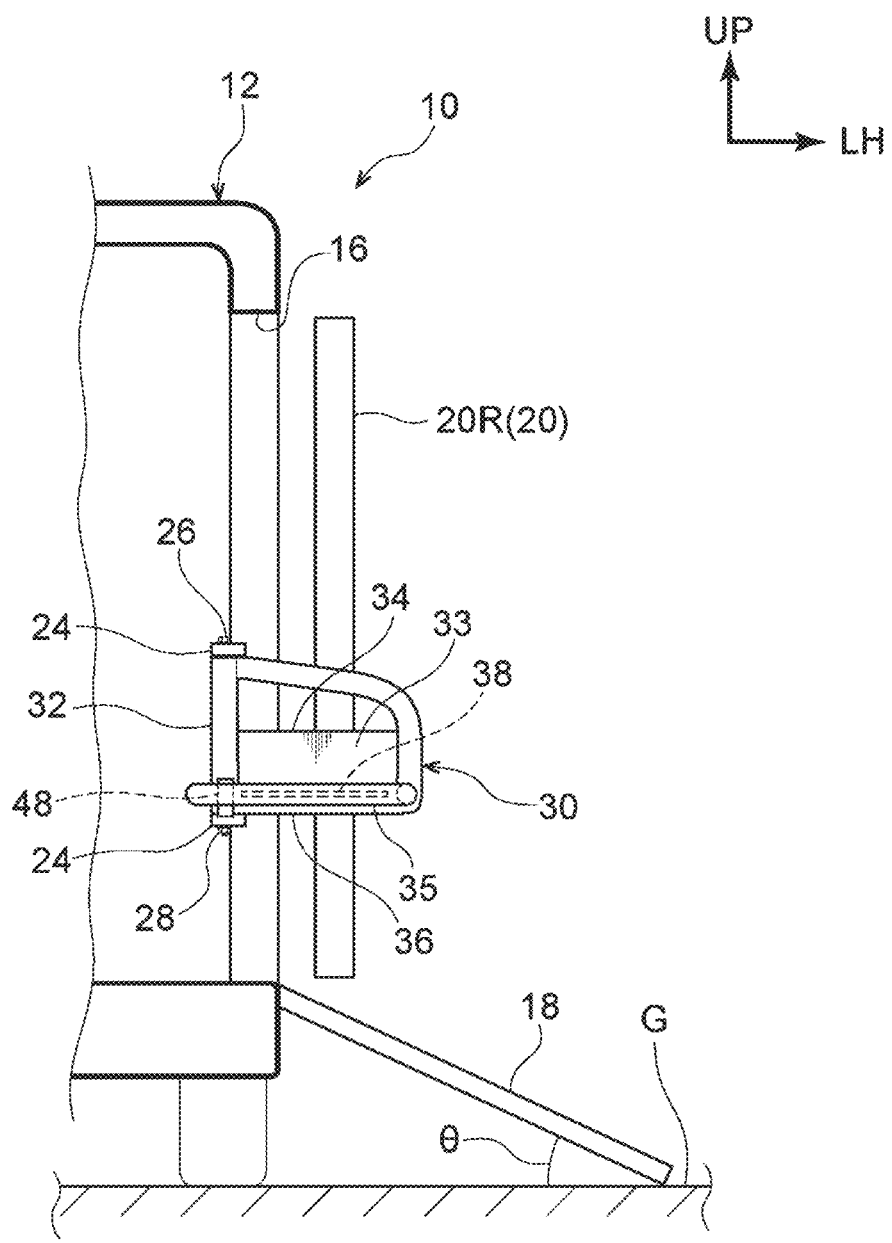
FIG. 8 is a front view showing an extended posture of the entrance handrail according to the present embodiment.

Further, a slope 18 that can project outward of the vehicle is housed in the vehicle body 12 (for example, under the floor panel) under the entrance 16. The slope 18 has a flat plate shape, and is configured to be electrically pulled out and stored. Then, as shown in FIG. 8, the slope 18 that is pulled out is disposed at a predetermined inclination angle θ as the tip end portion of the slope 18 in the pulling direction is supported on a road G.

Further, as shown in FIGS. 1 and 2, the bus 10 is provided with a pair of front and rear entrance handrails that takes a retracted posture in which the entrance handrails 30 are disposed along the sliding door 20 on the inner side (on the inner side in a vehicle width direction) of the entrance 16 when the sliding door 20 is closed and takes an extended posture in which the entrance handrails 30 project outward (outward in the vehicle width direction) from the entrance 16 when the sliding door 20 is opened.

The entrance handrails 30 are each made of metal (for example, made of aluminum) and are symmetrical with each other in the front-rear direction. The lengths of the entrance handrails 30 along the horizontal direction are formed to be the same as or smaller than the width of the half door 20F and the width of the half door 20R, respectively. With this configuration, the entrance handrails 30 can be disposed at the same height position at the entrance 16 (see FIG. 2).

Further, the entrance handrails 30 are configured to project outward in the vehicle width direction from the entrance 16 in conjunction with the opening operation of the sliding door 20 when the sliding door 20 (half door 20F and half door 20R) slides to open the entrance 16. Note that, the entrance handrails 30 are symmetrical with each other in the front-rear direction and have the same configuration. Therefore, the entrance handrail 30 on the rear side (half door 20R side) will be mainly described below as an example.

Figure 3:
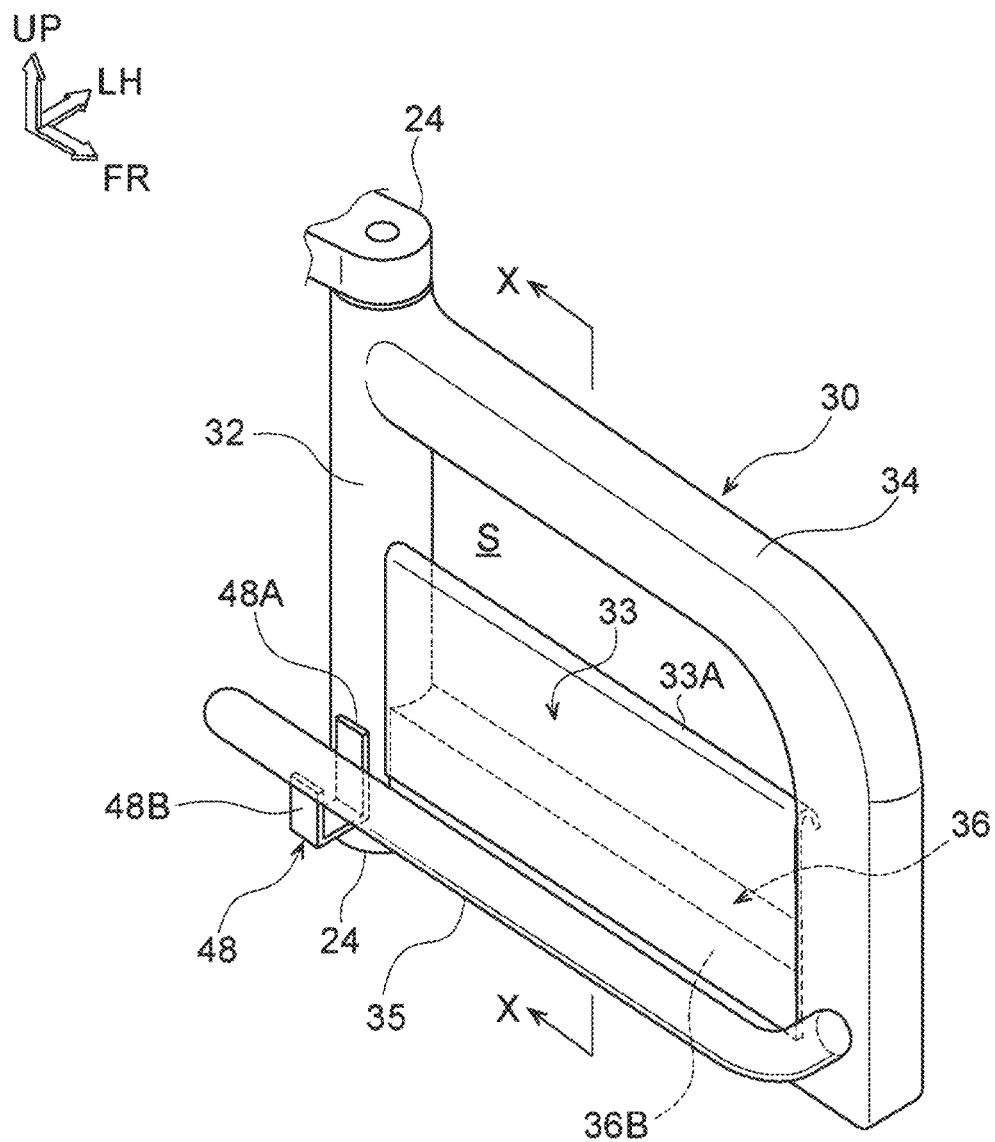
FIG. 3 is a perspective view showing the entrance handrail according to the present embodiment.
Figure 4:
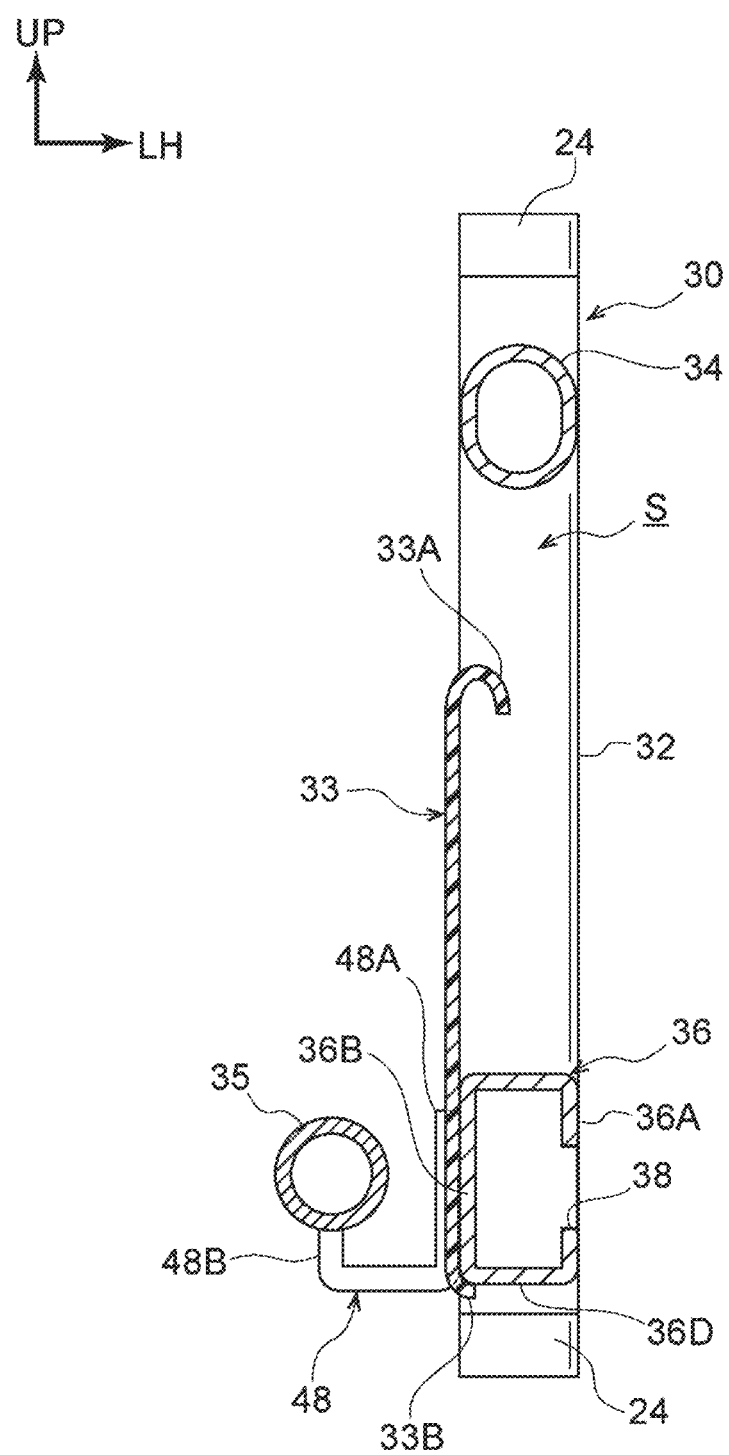
FIG. 4 is an enlarged sectional view taken along line X-X of FIG. 3.
Figure 5:
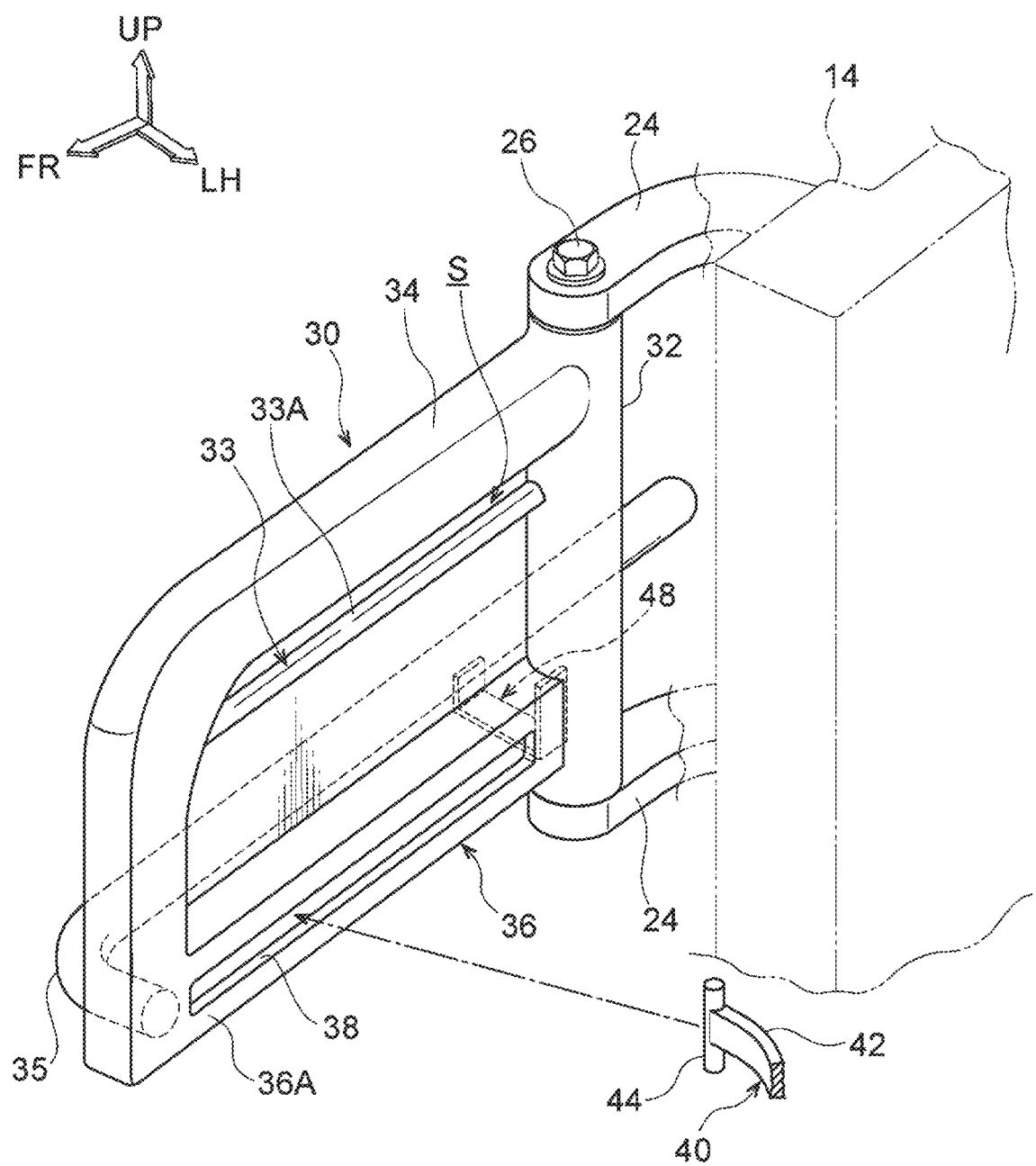
FIG. 5 is a perspective view showing the entrance handrail according to the present embodiment along with a slide member.

As shown in FIGS. 3 to 5, the entrance handrail 30 includes a substantially cylindrical base portion 32, a first handrail body 34 having one end portion integrally provided with the upper portion of the outer peripheral surface of the base portion 32, and a rail portion 36 having one end portion integrally provided with the lower portion of the outer peripheral surface of the base portion 32. The other end portion of the first handrail body 34 (tip end portion in the extending direction) and the other end portion of the rail portion 36 (tip end portion in the extending direction) are integrally connected to each other.

The base portion 32 is provided around the entrance 16 of the bus 10 (for example, on the inner wall surface of a pillar 14) so as to be rotatable around the up-down direction as an axial direction. Specifically, one end portion of a pair of upper and lower support arms 24 is integrally provided with the inner wall surface of the pillar 14 (see FIG. 5), and the base portion 32 is provided between the other ends of the support arms 24.

A circular through hole (not shown) is provided at the other end of each support arm 24, and each through hole communicates with a through hole (not shown) of the base portion 32. Therefore, the base portion 32 is rotatably supported by each support arm 24 as a shaft portion of a bolt 26 is inserted through the through holes communicating with each other from above and screwed into a nut 28 (see FIGS. 6 and 8) provided below.

The first handrail body 34 has a substantially cylindrical shape (substantially circular sectional shape) such that a passenger who enters or exits the bus through the entrance 16 can hold, and extends in a substantially inverted "L" shape from the upper portion of the base portion 32. That is, the first handrail body 34 has a shape such that the base portion 32 and the rail portion 36 form a substantially quadrangular frame.

The length of the first handrail body 34 along the horizontal direction may have a length to the extent that the first handrail body 34 does not project toward the half door 20F or the half door 20R when the entrance 16 is closed, and also a length to the extent that the passenger can easily enter and exit the bus while holding the first handrail body 34 at least when the passenger stands on a so-called step near the entrance 16 (for example, around 400 millimeters (mm) in the case where the length of the step along the vehicle width direction is around 300 mm). Further, a protective member (not shown) made of urethane, vinyl chloride, or the like may be wrapped around the first handrail body 34 such that the passenger can easily hold the first handrail body 34.

The rail portion 36 extends horizontally from the lower portion of the base portion 32, and integrally connects the lower portion of the base portion 32 and the other end portion (tip end portion in the extending direction) of the first handrail body 34. Then, the rail portion 36 holds a slide member 40 (see FIG. 5) so as to be slidable. The slide member 40 is attached to the end portion of each of the half door 20F and the half door 20R on the elastic body 22 side (see FIGS. 2, 7, and 9).

Specifically, the rail portion 36 has a substantially square tubular shape (substantially rectangular sectional shape) having a long side in the horizontal direction. As shown in FIG. 5, a slit portion 38 is provided in a substantially central portion in the up-down direction on one side wall of the rail portion 36, that is, an outer wall 36A facing rearward when in the extended posture and facing outward in the vehicle width direction when in the retracted posture. The slit portion 38 extends along the extending direction (longitudinal direction) to have a predetermined length, and communicates with the inside of the rail portion 36. Note that, the rail portion 36 is not a portion that the passenger holds.

Therefore, the rail portion 36 does not have to have a substantially circular sectional shape.

The slide member 40 has a substantially "T" shape when viewed in side view, and includes a body portion 42 that has a flat plate shape and is curved to have a substantially arc shape when viewed in plan view, a fitting portion 44 that has a substantially cylindrical shape and protrudes from the tip end portion of the body portion 42 in the up-down direction (with the up-down direction as an axial direction), and a base end portion 46 (see FIGS. 7 and 9) that has a substantially rectangular flat plate shape and is provided on the side opposite to the fitting portion 44 of the body portion 42.

The slide member 40 is attached to the rail portion 36 before the base end portion 46 is attached to each of the half door 20F and the half door 20R. That is, the fitting portion 44 is passed through the slit portion 38 of the rail portion 36 sideways (with the axial direction being along the horizontal direction) and rotated by 90 degrees. With this configuration, the fitting portion 44 has a configuration in which the fitting portion 44 can be fitted to the rail portion 36 so as to be slidable in the longitudinal direction without being disengaged from the rail portion 36.

Therefore, the width of the slit portion 38 (a clearance in the up-down direction) is larger than the outer diameter of the fitting portion 44, and is the same or slightly larger than the width of the body portion 42 of the slide member 40 (the length in the direction orthogonal to the thickness direction of the body portion 42 when viewed in side view). Then, the base end portion 46 of the slide member 40 is attached to each of the half door 20F and the half door 20R such that, after the fitting portion 44 is fit into the rail portion 36, the base end portion 46 is slightly slidable in the width direction of the half door 20F and the half door 20R (see FIGS. 7 and 9).

Further, as shown in FIGS. 3 to 5, the entrance handrail 30 is provided with a second handrail body 35 separately from the first handrail body 34. The second handrail body 35 has a substantially cylindrical shape (substantially circular sectional shape) such that a passenger who enters or exits the bus through the entrance 16 can hold. One end portion of the second handrail body 35 is supported by the tip end portion of the rail portion 36 in the extending direction, and the other end portion is supported by the base portion 32.

Specifically, the one end portion of the second handrail body 35 is bent at a substantially right angle when viewed in plan view (see FIGS. 7 and 9), and is integrally connected to the other side wall of the rail portion 36, that is, an inner wall 36B, at a joint portion with the first handrail body 34. The inner wall 36B faces inward in the width direction of the entrance 16 when in the extended posture, and faces the vehicle cabin side when in the retracted posture.

A bracket 48 that is a flat plate and has a substantially "J" shape when viewed from the longitudinal direction of the rail portion 36 is integrally provided with the lower end portion of the base portion 32 (see FIG. 4). That is, a side wall 48A of the bracket 48 having the higher height is joined to the outer peripheral surface of the lower end of the base portion 32 by welding or the like. Then, the outer peripheral surface (lower surface) of the second handrail body 35 on the other end portion side is joined to the upper end surface of a side wall 48B of the bracket 48 having the lower height by welding or the like.

With this configuration, the second handrail body 35 is disposed closer to the vehicle cabin than the rail portion 36 (first handrail body 34 when viewed in plan view) in a state where the sliding door 20 (half door 20F and half door 20R) closes the entrance 16. The second handrail body 35 is disposed inward of the rail portion 36 (first handrail body 34 when viewed in plan view) in the width direction of the entrance 16 when the sliding door 20 (half door 20F and half door 20R) opens the entrance 16.

In other words, the second handrail body 35 is configured to be disposed inward of the first handrail body 34 in the width direction of the entrance 16 with being offset by a predetermined length when viewed in plan view in the state where the sliding door 20 (half door 20F and half door 20R) opens the entrance 16, and has a space above the second handrail body 35. The second handrail body 35 is disposed so as to be parallel to the rail portion 36 and the first handrail body 34 when viewed in plan view and viewed in the longitudinal direction of the rail portion 36, and the second handrail body 35 is disposed below the first handrail body 34 over the entire length.

Therefore, the above-mentioned "predetermined length" is the shortest distance (interval) between the inner wall 36B of the rail portion 36 and the outer peripheral surface of the second handrail body 35 when viewed from the longitudinal direction of the rail portion 36. The shortest distance (interval) is, for example, about 40 mm. Further, the other end portion of the second handrail body 35 shown in the drawing extends for a predetermined length from the bracket 48 to the side opposite to the one end portion side. However, the present disclosure is not limited to this, and for example, the other end portion of the second handrail body 35 may be configured not to extend toward the side opposite from the bracket 48.

Further, a cover member 33 is provided between the rail portion 36 and the second handrail body 35 to suppress hand and fingers of the passenger from touching the rail portion 36. The cover member 33 has a horizontally long substantially rectangular flat plate shape, and has substantially the same length as the length of the rail portion 36 and has the height that is one-half to two-thirds (hereinafter referred to as "substantial lower half") of the height of the base portion 32.

Then, one end portion of the cover member 33 in the longitudinal direction is joined to the outer peripheral surface of the tip end portion of the first handrail body 34 extending in the up-down direction by welding or the like, and the other end portion of the cover member 33 in the longitudinal direction is joined to the outer peripheral surface of the base portion 32 by welding or the like. Further, the lower end portion of the cover member 33 is joined to the inner wall 36B of the rail portion 36 by welding or the like.

With this configuration, the cover member 33 covers the substantial lower half of a clearance portion S defined between the first handrail body 34 and the rail portion 36. Note that, as shown in FIG. 4, the upper end portion 33A of the cover member 33 is configured to be curved in a substantially arc shape when viewed from the longitudinal direction of the rail portion 36. Further, the lower end portion 33B of the cover member 33 is also slightly curved so as to be disposed along a lower wall 36D (lower surface) of the rail portion 36.

Next, the effect of the entrance handrail 30 according to the present embodiment having the above configuration will be described.

Figure 6:
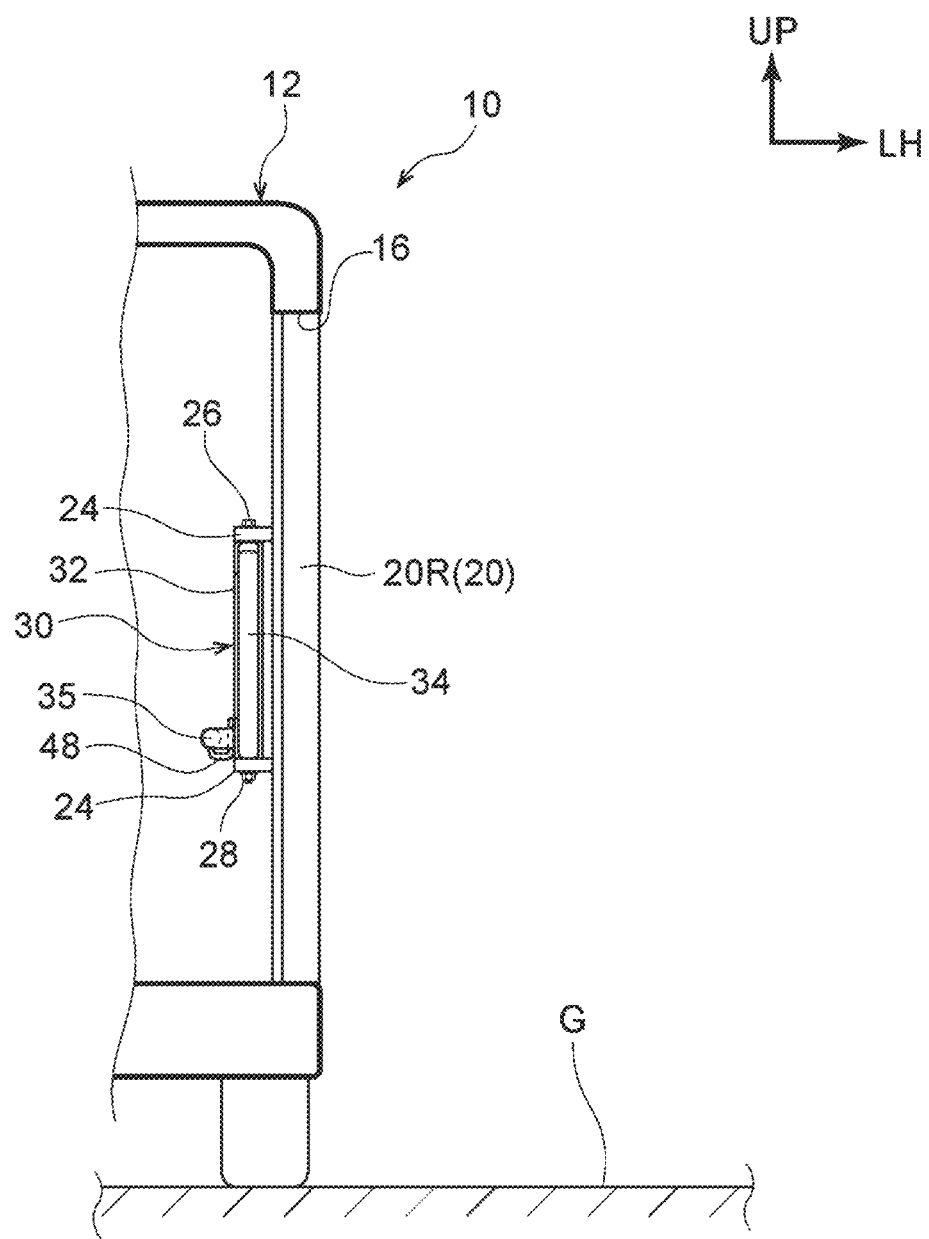
FIG. 6 is a front view showing a retracted posture of the entrance handrail according to the present embodiment.

As shown in FIGS. 6 and 7, when the entrance 16 is closed by the sliding door 20 (half door 20F and half door 20R), the entrance handrail 30 is disposed almost along the sliding door 20 when viewed in front view and viewed in plan view. Specifically, in the state where the sliding door 20 closes the entrance 16, the slide member 40 slides along the rail portion 36 to the side opposite to the base portion 32 side (the other end portion side), and the entrance handrail 30 takes the retracted posture in which the first handrail body 34, the second handrail body 35, and the rail portion 36 are stored along the sliding door 20.

That is, when the entrance handrail 30 takes the retracted posture, the first handrail body 34, the second handrail body 35, and the rail portion 36 do not project inward of the vehicle (to the vehicle cabin side) with the longitudinal direction as the vehicle width direction. Therefore, especially in the small-sized bus 10, it is possible to suppress imposing a limitation on the boarding space (secure the boarding space as much as possible) even when the entrance handrail 30 is provided.

On the other hand, as shown in FIGS. 8 and 9, when the entrance 16 is opened by the sliding door 20 (half door 20F and half door 20R), the entrance handrail 30 projects outward of the vehicle when viewed in front view and in plan view, with the longitudinal direction as the vehicle width direction. Specifically, in the state where the sliding door 20 opens the entrance 16, the slide member 40 slides along the rail portion 36 toward the base portion 32 side, and the entrance handrail 30 takes the extended posture in which the first handrail body 34, the second handrail body 35, and the rail portion 36 project outward of the vehicle (outward in the vehicle width direction).

Here, the second handrail body 35 is disposed inward of the rail portion 36 in the width direction of the entrance 16. Therefore, when the passenger enters or exits the bus 10, the passenger can select between the first handrail body 34 and the second handrail body 35, whichever makes it easier to enter and exit the bus 10. In particular, the second handrail body 35 is disposed with being offset with respect to the first handrail body 34 by the predetermined length as described above. Therefore, compared with the case where the second handrail body 35 is disposed directly below the first handrail body 34 (so as to overlap each other when viewed in plan view,) it is easier for the passenger to apply force to the second handrail body 35 from above.

More specifically, when the passenger exits the bus 10, there may be a case where the passenger brings his or her shoulder immediately above the second handrail body 35 to support his or her weight with an arm so as to reduce a burden applied to the leg to step down. That is, there may be a case where the passenger holds the second handrail body 35 and moves his or her body toward the first handrail body 34. At this time, since it is possible to suppress or prevent the arm of the passenger from contacting the first handrail body 34, it becomes easier for the passenger to apply force to the second handrail body 35 from above.

Further, the second handrail body 35 is disposed below the first handrail body 34 over the entire length. Therefore, the entrance handrail can be used by passengers of various heights. That is, the passenger can easily select and hold the first handrail body 34 or the second handrail body 35 in accordance with his or her height. Therefore, when entering and exiting the bus 10, the passenger can easily enter and exit the bus 10 while his or her posture is stabilized.

In particular, when exiting the bus 10, the passenger stands on one leg when the passenger lowers another leg. Therefore, when the first handrail body 34 or the second handrail body 35 is provided forward in the traveling direction, it becomes easier for the passenger to apply force, thereby further stabilizing the posture, as described above. Since the first handrail body 34 and the second handrail body 35 each have a substantially circular sectional shape, the passenger can easily hold the first handrail body 34 and the second handrail body 35, compared with the case where the first handrail body 34 and the second handrail body 35 each have a substantially rectangular sectional shape, for example.

Further, in the entrance handrail 30, the tip end portion of the first handrail body 34 in the extending direction (other end portion) and the tip end portion of the rail portion 36 in the extending direction are integrally connected to each other. Therefore, at least the rigidity and strength of the first handrail body 34, from the first handrail body 34 and the second handrail body 35, can be improved compared to the case where the tip end portion of the first handrail body 34 in the extending direction and the tip end portion of the rail portion 36 in the extending direction are not integrally connected to each other. Therefore, it becomes easier for the passenger to enter and exit the bus while holding at least the first handrail body 34.

Further, the other end portion side of the second handrail body 35 is attached to the lower end portion of the base portion 32 that rotatably supports the first handrail body 34 and the rail portion 36 via the bracket 48. Therefore, the rigidity and strength of the second handrail body 35 can be improved, compared with the configuration in which the other end portion side of the second handrail body 35 is attached to the rail portion 36 via the bracket 48, for example. Therefore, it becomes easier for the passenger to enter and exit the bus while holding the second handrail body 35.

Further, when the entrance handrail 30 takes the extended posture, a sufficient clearance is secured between the elastic body 22 attached to each of the half door 20F and the half door 20R and the first handrail body 34 into which fingers can be inserted. Therefore, while the passenger enters or exits the bus while holding the first handrail body 34, there is no possibility that the hand and fingers of the passenger are injured even when the hand and fingers are inserted between the elastic body 22 and the first handrail body 34 (even when the hand and fingers come into contact with the elastic body 22). That is, the safety of passengers can be ensured.

Further, the cover member 33 is provided between the rail portion 36 and the second handrail body 35 so as to suppress the hand and fingers of the passenger from touching the rail portion 36. Therefore, it is possible to suppress the passenger from accidentally touching the rail portion 36 and the hand and fingers of the passenger from being pinched between the slide member 40 and the rail portion 36. That is, the safety of passengers can be ensured.

Moreover, the upper end portion of the cover member 33 is curved in a substantially arc shape when viewed from the longitudinal direction of the rail portion 36. Therefore, even when the passenger mistakenly touches the upper end portion of the cover member 33 while the passenger holds the first handrail body 34, the hand and finger of the passenger can be suppressed from being injured. Moreover, the lower end portion of the cover member 33 is slightly curved along the lower wall 36D (lower surface) of the rail portion 36. Therefore, even when the passenger accidentally touches the lower end portion of the cover member 33 while the passenger holds the second handrail body 35, the hand and finger of the passenger can be suppressed from being injured.

Further, the cover member 33 covers the substantial lower half of the clearance portion S defined between the first handrail body 34 and the rail portion 36. Therefore, it is difficult for the passenger who is entering and exiting the bus 10 to see the rail portion 36. Therefore, it is possible to further suppress the passenger from accidentally holding the rail portion 36. Further, since the cover member 33 makes it difficult for the passenger who is entering and exiting the bus 10 to see the rail portion 36 and the slide member 40, the appearance of the entrance handrail 30 is also improved.

Figure 10:
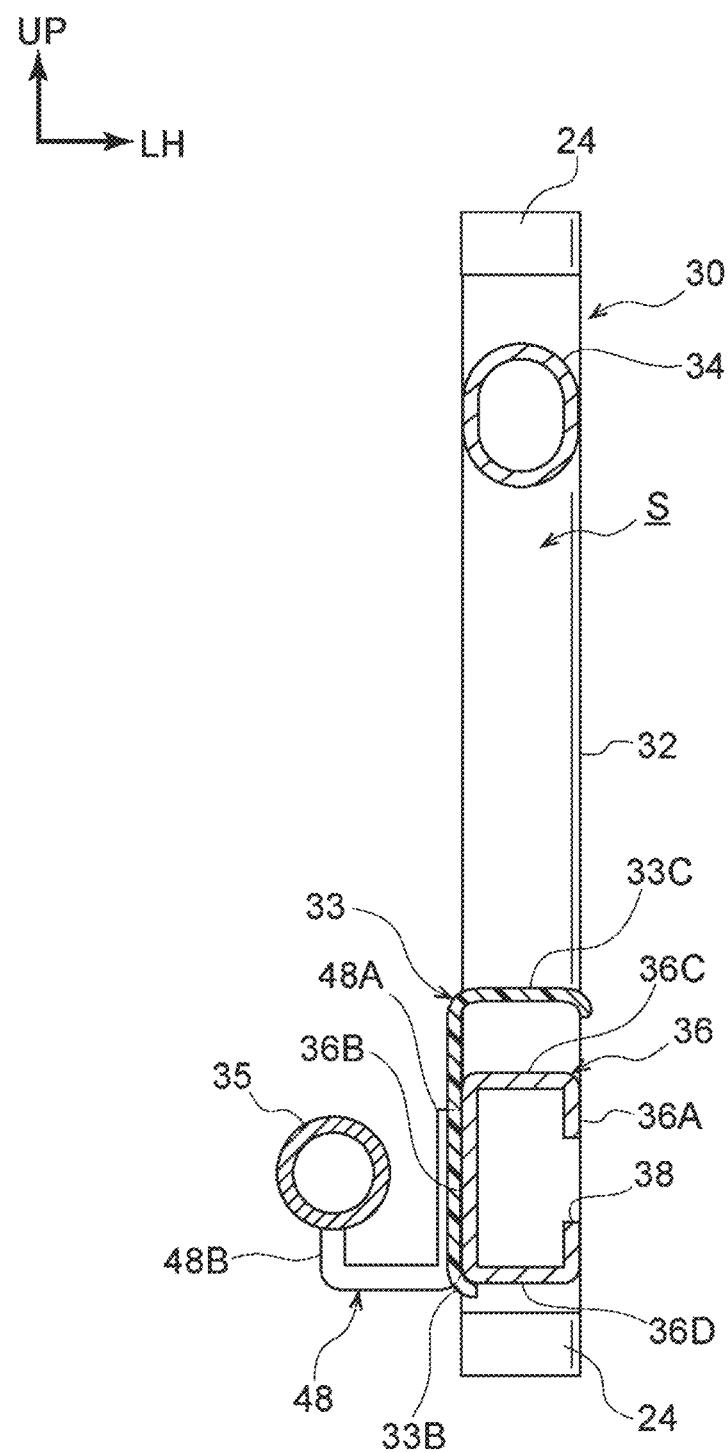
FIG. 10 is a sectional view showing a first modification of the entrance handrail corresponding to FIG. 4 according to the present embodiment.

Note that, the shape of the cover member 33 is not limited to the shape as described above, and may be, for example, the shape shown in FIG. 10. An upper portion 33C of the cover member 33 shown in FIG. 10 is bent at a substantially right angle so as to cover the upper side of the rail portion 36 when viewed from the longitudinal direction of the rail portion 36, and disposed close to an upper wall 36C (upper surface) of the rail portion 36.

According to the cover member 33 having such a shape, the size of the cover member 33 can be reduced as compared with that shown in FIG. 4 (because the cover member 33 can be configured with the minimum necessary size). Therefore, it is possible to suppress an increase in the weight of the vehicle and an increase in the manufacturing cost of the cover member 33.

Further, as shown in FIG. 11, a link arm 50 may be provided on the sliding door 20 (half door 20F and half door 20R) instead of the slide member 40. Specifically, taking the half door 20R side as an example, a base end portion 56 of the link arm 50 is rotatably provided at the end portion of the half door 20R on the elastic body 22 side.

A substantially trapezoidal protruding portion 21 when viewed in plan view is integrally provided with the end portion of the half door 20R on the elastic body 22 side and on the inner surface facing the vehicle cabin side when the entrance 16 is closed. The end portion of the half door 20R on the elastic body 22 side is thicker than other portions. A pair of upper and lower brackets 58 is attached to the tip end surface of the protruding portion 21 at predetermined intervals.

Each bracket 58 is provided with a through hole penetrating in the up-down direction, and the base end portion 56 of the link arm 50 is also provided with a through hole (not shown) penetrating in the up-down direction. Therefore, the base end portion 56 of the link arm 50 is inserted between the brackets 58, and a support shaft 57 is inserted and attached to the through holes communicating with each other, whereby the base end portion 56 of the link arm 50 is rotatably supported with the up-down direction as the axial direction.

On the other hand, a slide roller 54 as a rolling element is rotatably provided on the upper surface of a tip end portion 52 of the link arm 50 with the up-down direction as the axial direction. Therefore, the slide roller 54 comes into contact with the inner wall surface of the rail portion 36 facing the slit portion 38 or the inner wall surface on the slit portion 38 side and rolls such that the tip end portion 52 of the link arm 50 can reciprocate along the rail portion 36. Note that, the width of the slit portion 38 (clearance in the up-down direction) is provided to be slightly larger than the thickness of the link arm 50 along the up-down direction.

As described above, the tip end portion 52 (slide roller 54) of the link arm 50 of which base end portion 56 is rotatably attached to the sliding door 20 (half door 20F and half door 20R) is slidably retained by the rail portion 36, whereby the lengths of the first handrail body 34 and the rail portion 36 can be adjusted to any given lengths.

That is, since the base end portion 56 of the link arm 50 is rotatably supported, the length of the rail portion 36 can be shortened, and the length of the first handrail body 34 can be shortened accordingly. Therefore, in this case, when the entrance 16 is closed, it is possible to reliably suppress the first handrail body 34 on the half door 20R side from projecting toward the half door 20F side, and also possible to reliably suppress the first handrail body 34 on the half door 20F side from projecting toward the half door 20R side (see FIG. 2).

Further, an inner stopper 21A with which the link arm 50 comes into contact when the entrance handrail 30 takes the retracted posture, and an outer stopper 21B with which the link arm 50 comes into contact when the entrance handrail 30 takes the extended posture are provided on the tip end surfaces of the protruding portion 21 on respective sides of the base end portion 56 so as to project therefrom. The inner stopper 21A and the outer stopper 21B regulate the rotation range of the link arm 50 and suppress rattling of the link arm 50.

The entrance handrail 30 according to the present embodiment has been described above with reference to the drawings. However, the entrance handrail 30 according to the present embodiment is not limited to the illustrated embodiment and its design can be changed as appropriate within the scope of the present disclosure. For example, the other end portion side of the second handrail body 35 may be attached to the upper portion of the base portion 32 via the bracket 48.

That is, the second handrail body 35 may be provided obliquely so as to have the same angle as an inclination angle θ of the slope 18, for example. In this case, the other end portion of the second handrail body 35 (the portion extending to the side opposite to the one end portion side of the bracket 48 by a predetermined length) may be configured to be disposed above the first handrail body 34.

Further, the entrance handrail 30 is not limited to the configuration in which the entrance handrail 30 is provided for each of the half door 20F and the half door 20R constituting the sliding door 20, and may have a configuration in which the entrance handrail 30 is provided for only one half door (for example, the half door 20R) of the sliding door 20 is provided.

What is claimed is:

1. An entrance handrail comprising:
   a base portion that is rotatably provided around an entrance of a vehicle with an up-down direction of a vehicle body as an axial direction;
   a rail portion extending from a lower portion of the base portion and holding a slide member so as to be slidable, the slide member being attached to a sliding door that moves along an outer wall surface of the vehicle and that opens and closes the entrance;
   a first handrail body that extends from an upper portion of the base portion, is disposed on a vehicle cabin side as the slide member slides along the rail portion to a side opposite to the base portion side in a state where the sliding door closes the entrance, and projects outward of the vehicle as the slide member slides along the rail portion to the base portion side such that a passenger who enters or exits the vehicle through the entrance is able to hold the first handrail body in a state where the sliding door opens the entrance; and
   a second handrail body of which one end portion side is supported by a tip end portion of the rail portion in an extending direction and the other end portion side is supported by the base portion, and that is disposed on the vehicle cabin side with respect of the rail portion in the state where the sliding door closes the entrance and disposed inward of the rail portion in a width direction of the entrance such that the passenger who enters or exits the vehicle through the entrance is able to hold the second handrail body in the state where the sliding door opens the entrance.

2. The entrance handrail according to claim 1, wherein the second handrail body is disposed below the first handrail body in the up-down direction of the vehicle body over an entire length.

3. The entrance handrail according to claim 1, wherein a cover member is provided between the rail portion and the second handrail body such that hand and fingers of the passenger do not touch the rail portion.

4. The entrance handrail according to claim 3, wherein when viewed from a longitudinal direction of the rail portion, an upper end portion of the cover member is curved in an arc shape.

5. The entrance handrail according to claim 3, wherein when viewed from a longitudinal direction of the rail portion, an upper end portion of the cover member is bent at a right angle and covers an upper side of the rail portion in the up-down direction of the vehicle body.

6. The entrance handrail according to claim 1, wherein the tip end portion of the first handrail body in the extending direction and the tip end portion of the rail portion in the extending direction are integrally connected to each other.

\* \* \* \* \*